US008800922B2

(12) United States Patent
Schmid et al.

(10) Patent No.: US 8,800,922 B2
(45) Date of Patent: Aug. 12, 2014

(54) ELEMENTS FOR SIGNAL AND/OR POWER TRANSMISSION INTO OR TO CABIN COMPONENTS

(75) Inventors: Frank Schmid, Poppenricht (DE); Marc Renz, Schwabach (DE); Norbert Knopp, Leinburg (DE); Jürgen Grabmann, Nürnberg (DE); Dietmar Völkle, Biberach (DE); Markus Klingseis, Biberach (DE); Wolf-Dieter Kuhnla, Kaisheim-Leitheim (DE); Ralph Pätzold, Roth (DE); Dirk-Achim Schevardo, Röthenbach (DE); Peter Younes, Höchstadt a. d. Aisch (DE)

(73) Assignees: Diehl Aircabin GmbH, Laupheim (DE); Diehl Aerospace GmbH, Überlingen (DE)

( * ) Notice: Subject to any disclaimer, the term of this patent is extended or adjusted under 35 U.S.C. 154(b) by 209 days.

(21) Appl. No.: 13/181,623

(22) Filed: Jul. 13, 2011

(65) Prior Publication Data

US 2012/0012703 A1    Jan. 19, 2012

(30) Foreign Application Priority Data

Jul. 13, 2010    (DE) .......................... 10 2010 027 005

(51) Int. Cl.
*B64C 1/00*    (2006.01)

(52) U.S. Cl.
USPC ....................... 244/119; 244/123.1; 244/123.6

(58) Field of Classification Search
USPC .............. 244/118.5, 119, 120, 123.1, 123.13, 244/123.6
See application file for complete search history.

(56) References Cited

U.S. PATENT DOCUMENTS

| 2,644,777 | A | * | 7/1953 | Havens | ........................ 428/116 |
| 4,421,811 | A | * | 12/1983 | Rose et al. | ..................... 428/116 |
| 4,743,740 | A | * | 5/1988 | Adee | ............................. 219/548 |
| 2007/0158501 | A1 | * | 7/2007 | Shearer et al. | ............. 244/118.5 |
| 2007/0268173 | A1 | * | 11/2007 | Randy | ............................. 342/2 |
| 2009/0046502 | A1 | | 2/2009 | Agan et al. | |
| 2011/0114791 | A1 | * | 5/2011 | Henry et al. | ............... 244/123.6 |

FOREIGN PATENT DOCUMENTS

| DE | 3242978 A1 | 5/1984 |
| DE | 102006049030 B3 | 4/2008 |
| DE | 102009015856 A1 | 10/2010 |
| WO | 2010014644 A1 | 2/2010 |

* cited by examiner

*Primary Examiner* — Timothy D Collins
*Assistant Examiner* — Nicholas McFall
(74) *Attorney, Agent, or Firm* — Scully, Scott, Murphy & Presser, P.C.

(57) ABSTRACT

The description covers cabin components for aircraft, which can be produced with a sandwich structure and may have the components 1003 for signal and/or power transmission. The cabin components in this case have at least two prepreg layers 1001, 1005 and, for example, a honeycomb layer 1002, which can be connected to one another by pressing and heating. Furthermore, electrical and/or optical signal paths are shown on cabin components, which can be produced by positioning them there or printing. In addition, according to the description, signal and/or power transmission can take place beyond the boundary of cabin components, by means of a transmitter/receiver path.

5 Claims, 6 Drawing Sheets

ELEMENTS FOR SIGNAL AND/OR POWER TRANSMISSION INTO OR TO CABIN COMPONENTS

FIELD OF THE INVENTION

The present invention relates to a method for fitting a cabin component for an aircraft, to a cabin component for an aircraft and to a system for fitting in an aircraft.

BACKGROUND TO THE INVENTION

Cabin components for fitting in an aircraft are known in the prior art. It is also known for components for signal transmission and power transmission to be arranged on cabin components.

SUMMARY OF THE INVENTION

Until now, cabin components with electrical and/or electronic items arranged on them have been fitted sequentially, that is to say the cabin components within an aircraft have been fitted first of all, and the electronic, electrical or optical components have been firmly fitted to or in the cabin components. This can result in a multiplicity of successive work steps, which can lengthen the time to produce the aircraft. Furthermore, after the cabin components have been fitted, it is often necessary to adapt or to modify the arrangement of the electrical and/or optical signal paths, which can result in delays to the production process.

One object is therefore to allow cabin components to be fitted more quickly and more easily within an aircraft in which case, a further aim of the invention is to make it possible to react flexibly to requirements which result at short notice relating to the arrangement of electrical and/or optical signal paths which are arranged adjacent to or on cabin components.

As a first embodiment of the invention, a method is provided for fitting a cabin component for an aircraft, comprising the following steps:

arrangement of a sandwich structure comprising a first honeycomb for mechanical stiffening, a first prepreg layer above the first honeycomb and a second prepreg layer below the first honeycomb, arrangement of a component for signal and/or power transmission to or within the sandwich structure and heating and pressing of the sandwich structure.

According to the invention, before the heating and pressing of a sandwich structure with prepreg layers within the sandwich structure, respectively required electronics or respectively required electronic components or other components, such as plug connectors or optical waveguides, can be arranged on or within the sandwich structure. This makes it possible to produce a prefabricated cabin component after heating and pressing, thus allowing faster fitting of the cabin component, including corresponding electrical and/or electronic items.

A cabin component for an aircraft is provided as a second embodiment, comprising: a first honeycomb for mechanical stiffening, a first prepreg layer, a second prepreg layer, a component, wherein the cabin component can be produced using the above-described method.

A method for fitting a cabin component for an aircraft is provided as a third embodiment of the invention, comprising the following steps: positioning an optical or electrical path on the cabin component.

Positioning optical or electrical paths on a cabin component by, for example, printing or rolling allows an electrical or optical path to be fitted quickly and flexibly. This makes it possible to react flexibly to restrictions to the fitting of the cabin components within an aircraft or which restrictions may result only during the fitting process.

A system for fitting in an aircraft is provided as a fourth embodiment of the invention, comprising: a transmitter for signal emission and/or power emission and a receiver for signal reception and/or power reception, wherein the transmitter is arranged on a first cabin component for an aircraft, and the receiver is arranged on a second cabin component for an aircraft, and wherein the first cabin component and the second cabin component are different.

A transmitter/receiver path for transmission of power and/or information or signals makes it possible to cover spatial distances between cabin components which can result, for example, only when the cabin components are being fitted within the aircraft. A transmitter/receiver path therefore represents a flexible possible way to connect two or more spatially separated cabin components to one another for signalling and power transmission.

According to one exemplary embodiment of the invention, a method is provided, wherein the component is arranged above the first prepreg layer.

In a further embodiment according to the invention, a method is provided, wherein a second honeycomb is arranged below the first honeycomb, wherein the first honeycomb and the second honeycomb are arranged between the first prepreg layer and the second prepreg layer, and wherein the component is arranged between the first honeycomb and the second honeycomb.

The arrangement of the component between two honeycombs leads to encapsulation on all sides, for example of an electrical circuit, as a result of which there is no need to arrange further protection against mechanical loading, for example a housing.

According to a further exemplary embodiment of the present invention, a method is provided, wherein the component is arranged within a housing.

The arrangement of the component within a housing provides protection against mechanical and thermal loading during the pressing and heating process.

According to one exemplary embodiment of the invention, a method is provided, wherein an elastomer film for vibration damping is arranged between the first honeycomb and the second honeycomb.

An arrangement of an elastomer film between the honeycombs can lead to damping of mechanical vibration, thus allowing the component which is fitted in the sandwich structure to be protected against twisting.

In a further embodiment according to the invention, a method is provided, wherein the component is an electronic circuit, a printed circuit board, an electrical conductor track, an optical waveguide or a plug connector.

According to a further exemplary embodiment of the present invention, a method is provided, wherein the optical path is a carbon or a glass tape, and/or wherein an electrical path is positioned by printing an electrical conductor track. Carbon is a carbon-fibre-reinforced plastic.

An arrangement of electrical and/or optical paths by positioning or printing allows flexible matching to circumstances on the basis of the cabin components to which the paths are fitted, and which circumstances may, for example, occur only at short notice during final assembly.

One idea of the invention can be considered to provide cabin components for an aircraft which already have integrated components for signal and/or power transmission. The cabin components can be produced by heating and pressing a plurality of prepreg and honeycomb layers, in which case the components can be arranged between individual layers. A further aspect according to the invention represents the application of optical or electrical paths to cabin components, thus allowing appropriate optical and/or electrical paths to be arranged quickly and flexibly. Furthermore, according to the invention, transmitters and receivers for signal transmission and power transmission can be arranged on different cabin components, in order to allow spatial distances to be bridged between different cabin components.

The individual features may, of course, also be combined with one another, which may in some cases also result in advantageous effects which go beyond the sum of the individual effects.

BRIEF DESCRIPTION OF THE DRAWINGS

Further details and advantages of the invention will become clear from the exemplary embodiments which are illustrated in the drawings, in which.

DETAILED DESCRIPTION OF EXEMPLARY EMBODIMENTS

Figure 1:
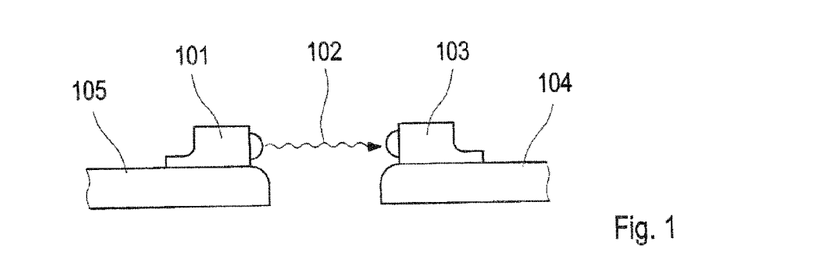
FIG. 1 shows a schematic illustration of optical signal transmission.

FIG. 1 shows a schematic illustration of optical signal transmission according to the invention with a transmitter 101 and a receiver 103, and a signal path 102 between the transmitter 101 and the receiver 103. The transmitter 101 and the receiver 103 may in this case be arranged on different cabin components 104, 105. The provision of an optical signal path 102 makes it possible to cover even relatively long spatial distances, and to flexibly cover distances between cabin components 104, 105 which are fitted with transmitters 101 and receivers 103.

Figure 2:
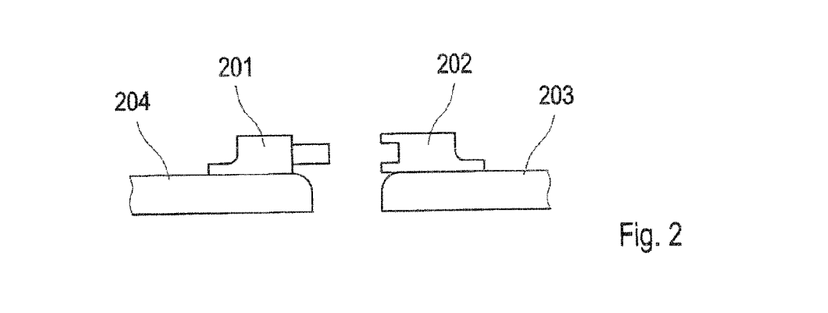
FIG. 2 shows a schematic illustration of inductive power transmission.

FIG. 2 shows an alternative embodiment for covering a distance between two cabin components 203, 204 by means of two elements 201, 202 which can be provided for inductive power transmission.

The arrangements shown in FIG. 1 and FIG. 2 make it possible to react flexibly to situations which occur while cabin components are being fitted within an aircraft. This flexibility is particularly advantageous when having to bridge intermediate spaces which can occur only late on during the assembly process.

Figure 3:
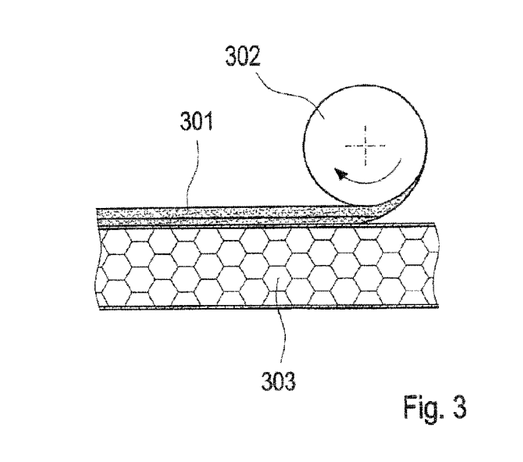
FIG. 3 shows the positioning of optical or electrical paths.

FIG. 3 shows a longitudinal section through a cabin component 303 to which a carbon or glass tape 301, 302 can be applied. Optical or electrical paths can be positioned by application.

Figure 4:
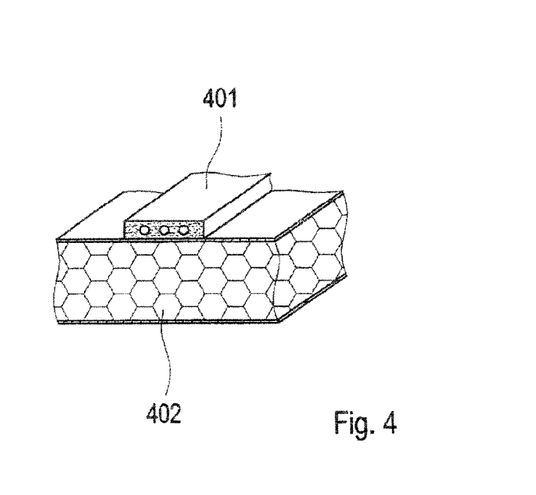
FIG. 4 shows a conductor track which has been positioned.

FIG. 4 shows a cross-sectional illustration of a cabin component 402, in which the carbon or the glass tape 401 may be arranged on the cabin component 402.

Figure 5:
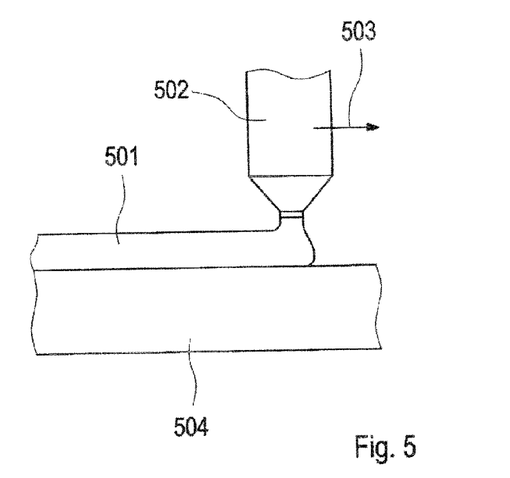
FIG. 5 shows the printing of electrical conductor tracks.

FIG. 5 shows an electrical conductor track 501 printed onto a cabin component 504 with a nozzle 502, which can be moved in the direction 503.

Figure 6:
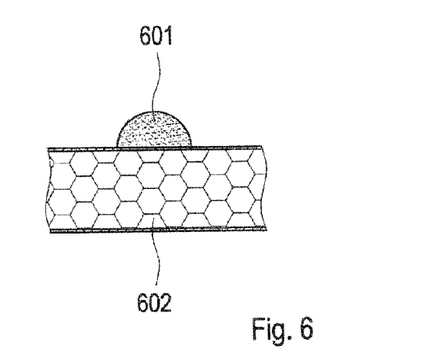
FIG. 6 shows a schematic illustration of a printed conductor track.

FIG. 6 show a cross section through a cabin component 602 having an electrical conductor track 601, which can be applied by a nozzle to the cabin component 602.

In the case of the methods shown in FIG. 3 to FIG. 6, there is advantageously no need to prefabricate electrical or optical conductor tracks, thus allowing simpler work preparation for fitting the cabin components within an aircraft. This makes it possible to react flexibly to short-term changes in the arrangement of cabin components, which can represent the supports for the electrical conductor tracks and/or the optical signal paths.

Figure 7:
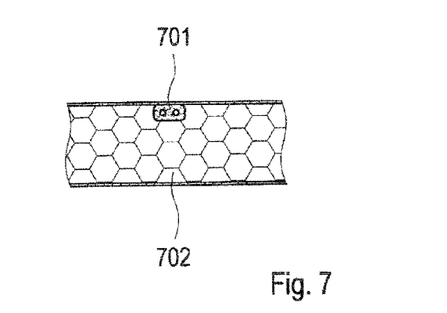
FIG. 7 shows a schematic illustration of a pressed-in optical waveguide.

FIG. 7 shows an optical waveguide 701, which can be pressed into a cabin component 702. On the one hand, this would advantageously allow the optical waveguide 701 to be protected against environmental influences without any need, for example, for a housing for this purpose. In addition, pressing the optical waveguide 701 into the cabin component 702 according to the invention results in a simplification of the assembly process since an appropriate optical waveguide would have also been fitted simply by the fitting of the cabin component.

Figure 8:
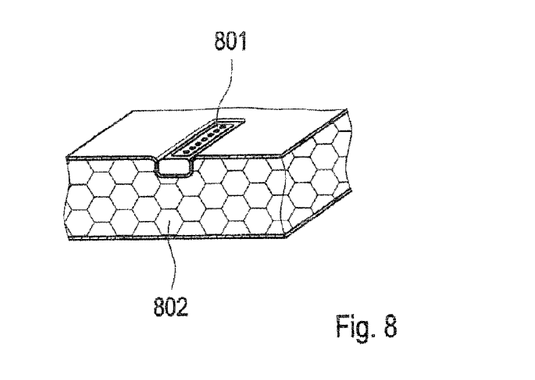
FIG. 8 shows a schematic illustration of a pressed-in plug connector.

FIG. 8 shows a plug connector 801 which has been pressed into a cabin component 802, thus providing protection against damage, for example by mechanical loading for the plug connector 801, without any additional components as well. Furthermore, the assembly process can be carried out more easily since the plug connector 801 associated with the cabin component 802 has already been fitted, and there is therefore no need for the plug connector 801 to be separately fitted.

Figure 9:
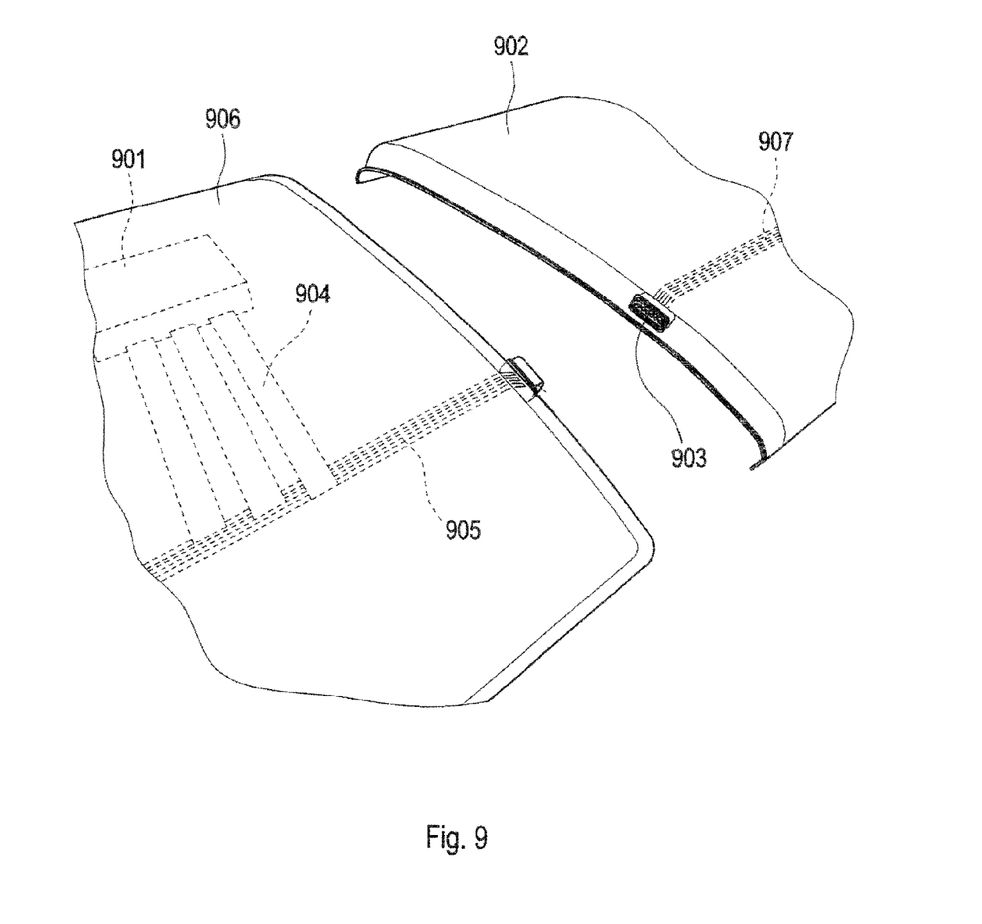
FIG. 9 shows an illustration of daisy-chain integration.

FIG. 9 shows cabin components 902, 906, in which a plug connector 903 can be embedded in one cabin component 902, and a complementary plug element can be integrated in another cabin component 906. Furthermore, according to the invention, components for forming a daisy-chain network can be integrated in the cabin components 902, 906. The plug connectors 903 may connect electrical conductor tracks 905, 907 thus allowing electrical components to be driven, for example, by a drive board 901 via a plurality of cabin components 902, 906.

Figure 10:
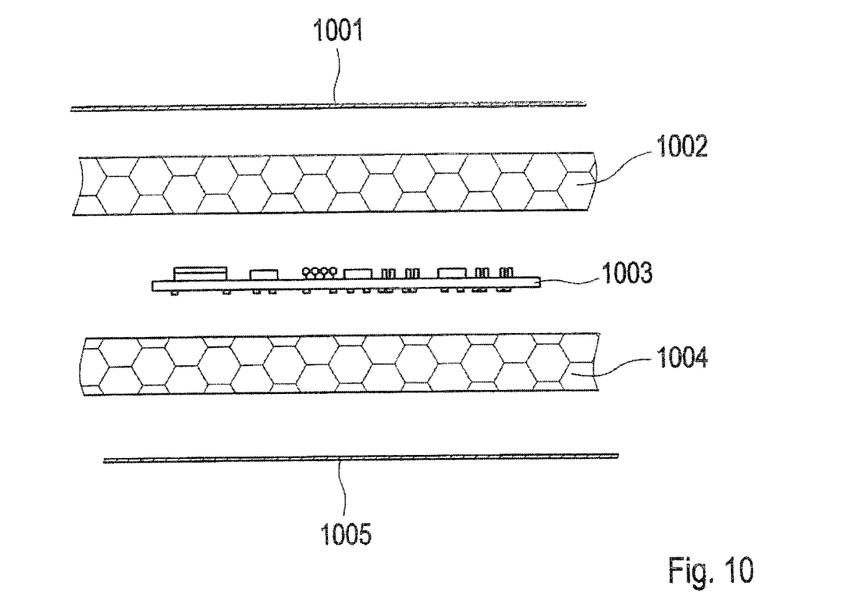
FIG. 10 shows an illustration of a sandwich structure before the pressing process.

FIG. 10 shows a sandwich structure according to the invention having a first prepreg layer 1001, a first honeycomb 1002, a board 1003, comprising a printed circuit board on which electronic components can be arranged, a second honeycomb 1004 and a second prepreg layer 1005. According to the invention, the sandwich structure can be connected by heating and pressing, in order to produce a finished cabin component which already has the appropriate electronics. This allows a prefabricated cabin component to be produced whose fitting can itself lead to the arrangement of the appropriate electronics, thus making it possible to speed up the assembly process, since there is no need to separately fit the electronics. Furthermore, in particular, the first honeycomb 1002 and the second honeycomb 1004 represent protection for the electronics against, for example, mechanical and/or thermal loading.

A prepreg (pre-impregnated fibres) means a semi-finished product which consists of endless fibres and a reactive resin. Prepregs are cured under pressure and a high temperature. During heating, the resin is liquefied and embeds the fibres before it starts to cure. Honeycombs which are arranged between two prepreg layers are used primarily for mechanical stiffening and, according to the invention, for protection of embedded electronics against, for example, mechanical loading.

Figure 11:
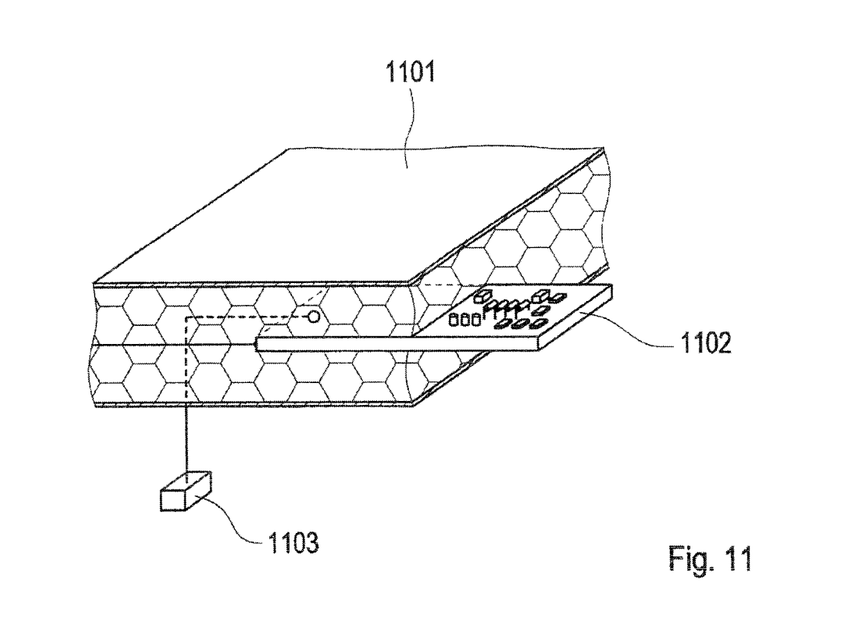
FIG. 11 shows a schematic illustration of an external interface.

FIG. 11 shows a cross section through a cabin component 1101 which has been pressed together and has a printed circuit board 1102, which has been pressed in the centre of the cabin component and, for example, may have an external interface 1103.

Figure 12:
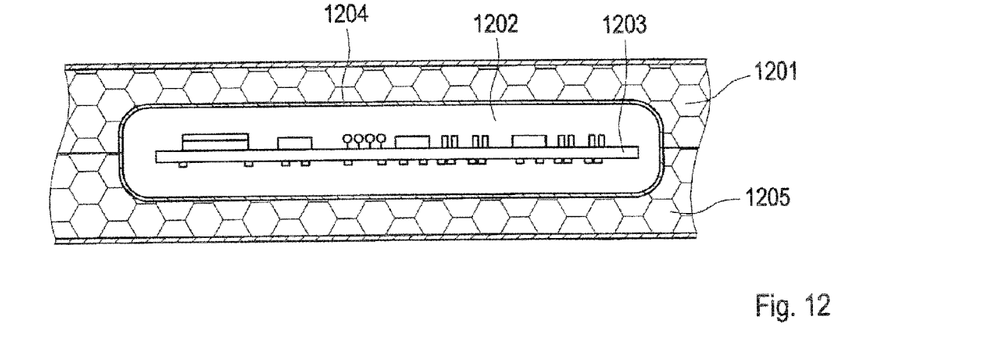
FIG. 12 shows a housing for protection of a board.

FIG. 12 shows a printed circuit board 1203 which can be arranged pressed in between two honeycombs 1201, 1205, in which case the printed circuit board 1203 can be incorporated within a housing 1204 before the hot-pressing process, in order to be protected against mechanical and thermal loading. The internal area 1202 of the housing 1204 should be sufficiently large to allow sufficient space for the internal printed circuit board 1203, even after the hot-pressing process.

Figure 13:
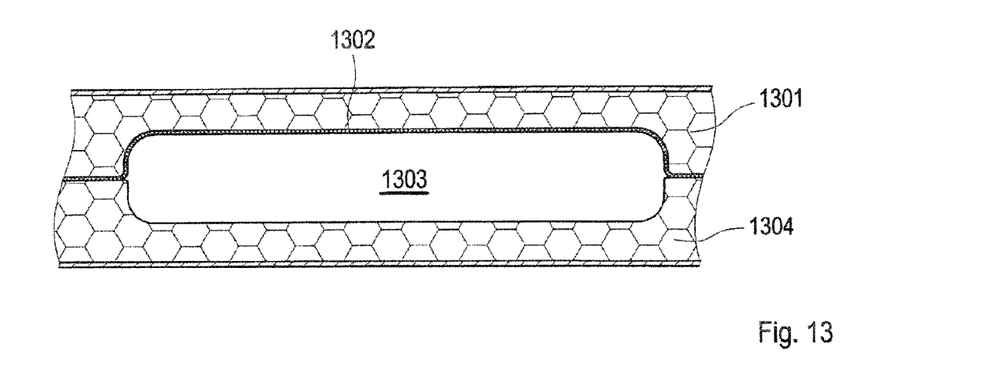
FIG. 13 shows a schematic illustration of a sandwich structure having an elastomer film.

FIG. 13 shows an embodiment according to the invention of an internal area 1303 for holding, for example, a printed circuit board, in which case an elastomer film for vibration damping can be arranged between the individual honeycombs 1301, 1304. This makes it possible to provide twisting protection for a printed circuit board which is located within the internal area 1303.

Figure 14:
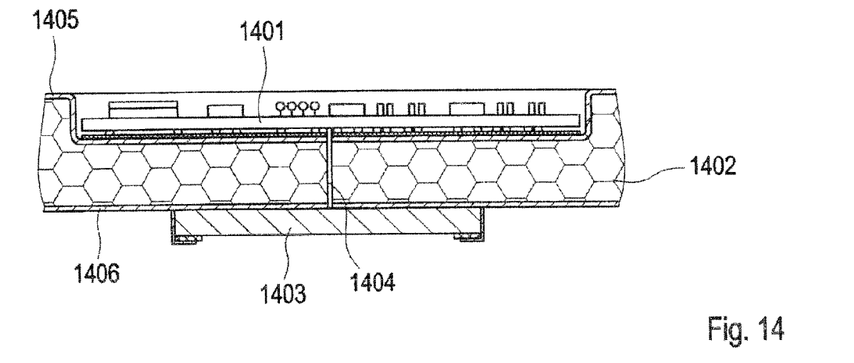
FIG. 14 shows an illustration of a sandwich structure having a display and a drive.

FIG. 14 shows an arrangement of a display 1403 having electronics 1401 which drive the display 1403, in which case the electronics 1401 can be pressed into the honeycomb 1402, thus making it possible to protect the electronics 1401 against mechanical loading. Electrical conductor tracks 1404 or optical signal paths can be passed through the honeycomb 1402 between the electronics 1401 and the display 1403, in order to allow the display 1403 to be driven.

Figure 15:
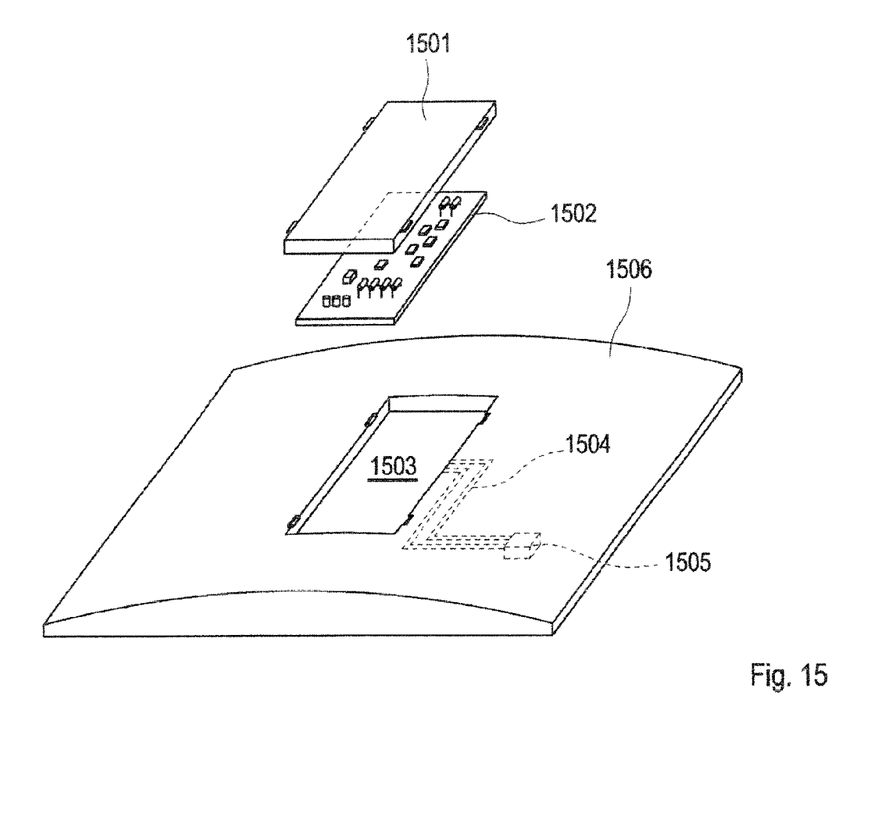
FIG. 15 shows integration of a printed circuit board in a cabin component.

FIG. 15 shows a printed circuit board 1502 on which electronic components can be arranged, for example resistors, diodes, integrated circuits, etc. This printed circuit board 1502 can be introduced in a recess 1503 in a cabin component 1506. The embedded printed circuit board 1502 can be sealed by a cover 1501, in order to allow protection against mechanical loading and/or for example liquids. By way of example, conductor tracks 1504 may have already been arranged in the cabin component 1506, in order to allow a connection to other printed circuit boards 1505, sensors and/or actuators.

It should be noted that the term "comprise" does not exclude further elements or method steps and, in the same way, the term "one" or "a" does not preclude a plurality of elements and steps.

The reference symbols used serve only to improve understanding and should in no way be considered restrictive, with the scope of protection of the invention being reflected by the claims.

LIST OF REFERENCE SYMBOLS

101 Transmitter
102 Optical signal path
103 Receiver
104 Cabin component
105 Cabin component
201 Component for inductive power transmission
202 Component for inductive power transmission
203 Cabin component
204 Cabin component
301 Carbon or glass tape
302 Roll of carbon or glass tape
303 Cabin component
401 Optical or electrical path
402 Cabin component
501 Electrical conductor track
502 Nozzle
503 Movement direction
504 Cabin component
601 Conductor track
602 Cabin component
701 Optical waveguide
702 Cabin component
801 Plug connector
802 Cabin component
901 Component
902 Cabin component
903 Plug connector
904 Electrical conductor track
905 Electrical conductor track
906 Cabin component
907 Electrical conductor track
1001 Prepreg layer
1002 Honeycomb
1003 Printed circuit board
1004 Honeycomb
1005 Prepreg layer
1101 Cabin component
1102 Printed circuit board
1103 External interface
1201 Honeycomb
1202 Recess
1203 Printed circuit board
1204 Housing
1205 Honeycomb
1301 Honeycomb
1302 Elastomer film
1303 Recess
1304 Honeycomb
1401 Printed circuit board
1402 Honeycomb
1403 Display
1404 Electrical conductor track
1405 Prepreg layer
1406 Prepreg layer
1501 Cover
1502 Printed circuit board
1503 Recess
1504 Electrical conductor track
1505 Component
1506 Cabin component

The invention claimed is:
1. A method for fitting a cabin component for an aircraft, comprising the following steps:
providing a sandwich structure comprising a first honeycomb for mechanical stiffening, a second honeycomb below the first honeycomb, a first prepreg layer above the first honeycomb and a second prepreg layer below the second honeycomb,
providing a component which transmits optical signals, electrical signals or power between the first honeycomb and the second honeycomb, and heating and pressing the sandwich structure for curing the sandwich structure with the component between the first honeycomb and the second honeycomb.

2. The method according to claim 1, wherein the component is arranged within a housing.

3. The method according to claim 1, wherein an elastomer film for vibration damping is arranged between the first honeycomb and the second honeycomb.

4. The method according to claim 1, wherein the component comprises at least one of an electronic circuit, a printed circuit board, an electrical conductor track, an optical waveguide and a plug connector.

5. A cabin component for an aircraft, comprising:
- a sandwich structure comprising a first honeycomb for mechanical stiffening, a second honeycomb below the first honeycomb, a first prepreg layer above the first honeycomb and a second prepreg layer below the second honeycomb, and
- a component which transmits optical signals, electrical signals or power, said component disposed between the first honeycomb and the second honeycomb,
- wherein the sandwich structure is heated and pressed for curing the sandwich structure with the component between the first honeycomb and the second honeycomb.

* * * * *